Sept. 6, 1955 J. M. COOPER 2,717,132

AUTOMATIC APPROACH SYSTEM

Filed Jan. 7, 1953 2 Sheets-Sheet 1

Inventor:
James M. Cooper,
by Richard E. Hosley
His Attorney.

Sept. 6, 1955 J. M. COOPER 2,717,132

AUTOMATIC APPROACH SYSTEM

Filed Jan. 7, 1953 2 Sheets-Sheet 2

Inventor:
James M. Cooper,
by Richard E. Hosley
His Attorney.

United States Patent Office 2,717,132
Patented Sept. 6, 1955

2,717,132

AUTOMATIC APPROACH SYSTEM

James M. Cooper, Schenectady, N. Y., assignor to General Electric Company, a corporation of New York Application January 7, 1953, Serial No. 329,959
13 Claims. (Cl. 244—77)

This invention generally relates to an aircraft instrument landing system, and more particularly to a landing system of the type wherein an aircraft is automatically directed on a controlled flight path to approach a radio beam, and thereafter is automatically aligned with and guided by the beam to a designated airfield.

Automatic instrument landing systems basically comprise a ground transmitter propagating a narrowly focused electromagnetic beam into space, and guidance apparatus aboard the aircraft for receiving the beam and thereafter directing the aircraft to approach the airfield along the narrow path defined by this focused beam.

To provide for automatic following of this beam, it is, of course, necessary for the aircraft guidance apparatus in such a landing system to detect any deviation in the position of the aircraft from the beam direction and thereafter correct this position in accordance with the deviation error. One manner of ascribing these directional characteristics to such a system has been to propagate two adjoining beams of electromagnetic energy into space having overlapping areas, each beam modulated at a different frequency, and in conjunction therewith provide a receiver in the aircraft having an output response which differs for each beam. Should the aircraft position then deviate from a path equally disposed between the two beams, the energy received from one of the beams would predominate over the other, resulting in an indication of the error and the direction of the error and enabling a correction to be made therefor.

Heretofore, such a system, termed an automatic instrument landing system, has been devised. A receiver in this system when actuated by one of said twin beams provides a positive signal, and when actuated by the other of said beams provides a negative signal. However, should equal energies be received from both beams, indicating a correct flight path intermediate the beams the negative and positive signals cancel to yield a zero output. Similarly, for any other aircraft position within the confines of the overlapping areas of the twin beams, the receiver, absorbing varying amounts of energy from the two beams, provides an output whose magnitude varies linearly in accordance with its distance from the zero output line, and whose polarity indicates direction, i. e. left or right, of the zero output line. To complete the automatic guidance of the aircraft, these positive or negative receiver signals have then been applied to a conventional autopilot adapted to respond to the polarity thereof to effect proper directional positioning of the aircraft to correct for the error, and respond to the magitude thereof to effect the degree of positioning in the direction determined by the signal polarity.

Although this system has proved highly satisfactory in automatically directing an aircraft toward a landing field once the aircraft has found the zero center line of the twin beams, manual navigation by the pilot has heretofore been required both to properly direct the plane toward the beams from outside the beam confines and also to properly align the aircraft therewith once it reaches the beams. These latter manual operations, because of the high speeds of modern aircraft, are difficult, exacting, and time consuming, and they introduce opportunities for human error. Fuprthermore, inasmuch as this automatic aircraft guidance is generally employed only when weather conditions or other disturbances prevent a normal landing, the pilot is generally placed under great tension during this time.

The present invention is directed toward overcoming this opportunity for human error by enabling part of the manual operation in approaching the beams and aligning the aircraft therewith to be eliminated and automatic control substituted therefor. More specifically, the presently proposed automatic instrument landing system may be engaged at any time the aircraft is sufficiently near the overlapping beam area to receive energy therefrom; whereupon the aircraft is then automatically directed to assume a right angle approach toward the overlapping beam area and after entering the confines thereof, properly align itself with the center line of the twin beams, and thereafter continue along this line toward the airfield landing strip.

It is, accordingly, one object of this invention to provide an improved automatic instrument landing system.

Another object of this invention is to provide a guidance system for automatically directing a flying aircraft into alignment with a ground generated radio beam and thereafter controlling its flight path along the beam to a designated airfield.

Still another object of this invention is to provide a gyroscopically stabilized guidance system for automatically directing a flying aircraft into alignment with a radio beam emanating from a ground station, and thereafter directing its flight path along the beam to the designated station.

Another object of this invention is to provide a guidance system for automatically directing a flying aircraft into alignment with a twin radio beam from either side thereof along a predetermined stabilized approach angle.

Another object of this invention is to provide a system for automatically directing an aircraft toward a radio beam at a 90° angle, and upon entering the beam to automatically align the aircraft heading therewith.

Other objects and many attendant advantages will be more clearly comprehended from the following detailed description taken in conjunction with the accompanying drawing in which.

Figures 1, 2:
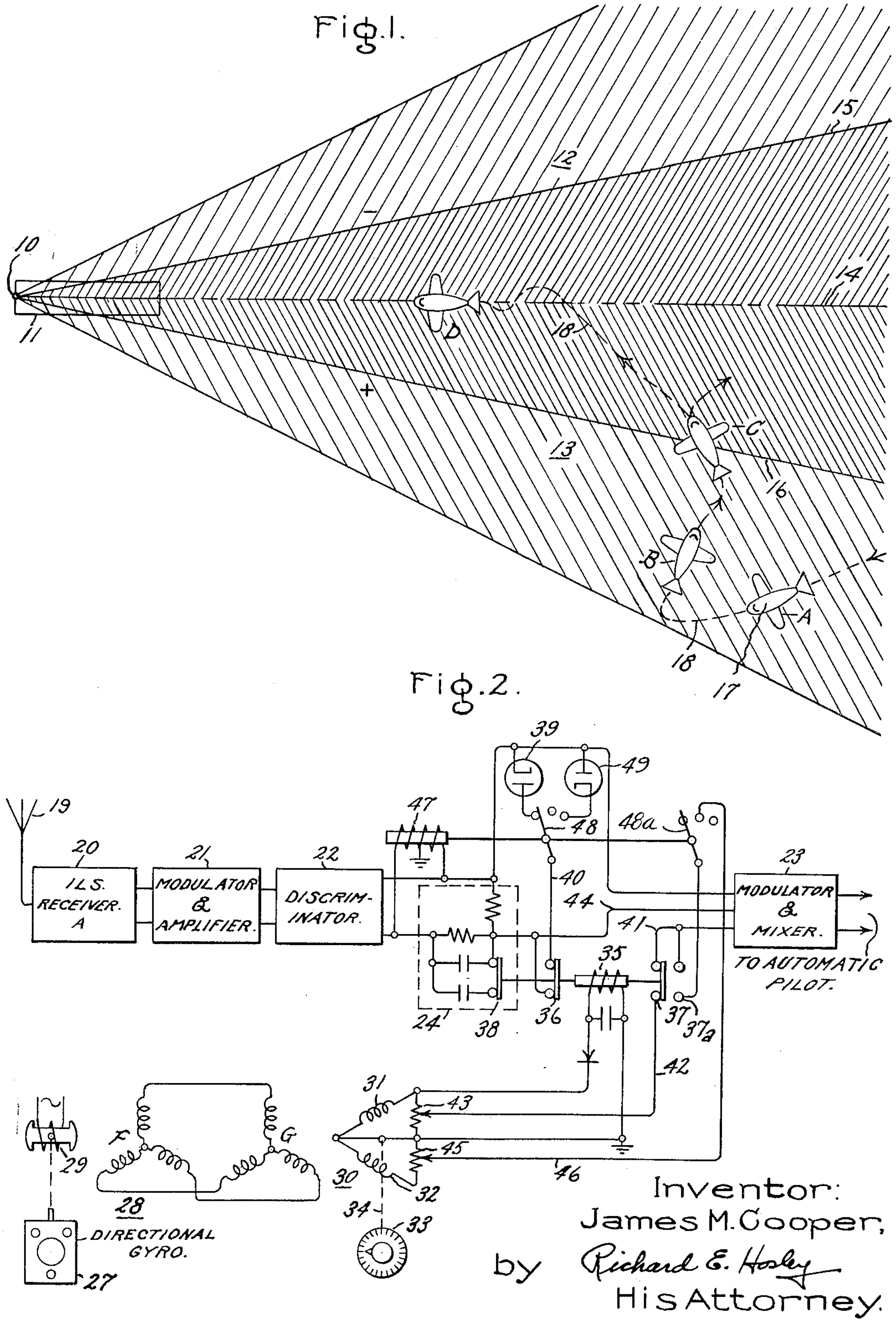
Fig. 1 is a representative sketch of the controlled azimuth flight path of an aircraft when guided by means of the present invention.
Fig. 2 is a schematic diagram partially in block form of an electrical circuit illustrating one proposed embodiment of the present invention.

Referring now to the drawings for a detailed consideration of one embodiment of the present invention, and initially considering in detail the operation of the above discussed conventional instrument landing system; a radio transmitter 10, located at the edge of one runway 11 of an airfield (not shown) generates two beams of radio energy, generally designated 12 and 13, each modulated at a different frequency, and directionally propagated into space. Each beam is slightly displaced from an imaginary center dividing line 14 and has a wave front moving along one of the imaginary lines 15 and 16 at an acute angle therefrom. Within the space intermediate imaginary lines 15 and 16 the two radio beams overlap, and because of the symmetrical arrangement thereof, the energy level from each is equal along imaginary center dividing line 14. In the space outside the imaginary wave front lines 15 and 16, however, the energy from the adjoining radio beam predominates and that from the remote beam is negligible, i. e. outside line 15, beam 12 predominates and outside line 16 beam 13 predominates.

A radio receiver located within an aircraft 17, is tuned to the frequencies of both beams and provides a positive output signal upon being energized by one of said beams, and a negative output signal upon being energized by the other of said beams. Hereinafter, for purposes of uniformity, the receiver output signal from beam 13 will be considered as positive and that from beam 12 considered as negative. Thus, should an aircraft be positioned beyond wave front 16 in space, as illustrated by aircraft 17 in position A of Fig. 1, at which position the radio energy of beam 13 predominates, the receiver provides a constant positive output. Similarly, should an aircraft be positioned beyond line 15 in space, at which position the radio energy of beam 12 predominates, the receiver provides a constant negative output. However, for any aircraft position in space intermediate wave front lines 15 and 16, the receiver is energized by both beams, thereby providing a signal output whose magnitude is proportional to the difference in the two beam field intensities received at that position, and whose polarity is determined by the beam having the larger field intensity at that position. Due to the symmetry of the beams, therefore, the resultant field intensity varies linearly from each wave front toward the dividing line and accordingly this area within wave front lines 15 and 16 will hereinafter be termed the area of linear signal variations, and line 14 equally dividing this area termed the receiver zero output line.

Now considering the operation of a conventional instrument landing system for an aircraft flying along zero line 14 as in position D of Fig. 1, and assuming that the autopilot directs the aircraft to turn right in response to a positive receiver signal and left in response to a negative receiver signal, it is clear that should the plane deviate to the left into beam 13, the resulting positive signal to the autopilot, indicating an error, compels a right turn back onto line 14. Similarly, an aircraft deviation to the right into beam 12, results in a negative receiver signal to the autopilot thereby compelling a left turn back onto line 14.

Considering a second situation, as illustrated by Fig. 1 wherein the aircraft is approaching zero line 14 from inside the beam area of linear deviation, such as from illustrated position C, a receiver signal being positive at position C ordinarily directs the aircraft to the right as shown by the unconnected arrowed line thereby causing the aircraft to head in the opposite direction from the airfield 11. This latter operation is obviously in error, and therefore if this system alone were used, the pilot would be required to manually direct the aircraft to zero line 14 and thereafter engage the automatic instrument landing system. Due to the fact, however, that the receiver signal varies linearly from a positive value to zero as the aircraft moves from line 16 toward zero line 14, this situation has been remedied by employing a rate circuit in the aircraft receiver to determine the rate at which the error signal is varying. By employing a rate circuit the receiver provides a negative signal to the autopilot as the aircraft position is varied from line 16, for example, having a greater resultant positive field intensity, toward line 14, having a zero resultant positive field intensity, and the aircraft responding to this negative rate signal is accordingly directed to the left and toward center line 14, as illustrated by flight path 18 in Fig. 1.

Now, considering the third situation, as illustrated by Fig. 1 wherein the aircraft is approaching the radio beam from outside the area of linear deviation, such as from illustrated positions A or B, wherein the beam field intensity is substantially that of beam 13 and therefore produces an essentially constant positive signal; the rate circuit is of no avail and therefore the receiver provides a positive signal to the autopilot. This positive signal directs the aircraft to turn right in a direction away from the airfield 11, and thereafter continue to turn right until the receiver is no longer positioned in the beam; thus in effect causing the aircraft to lose the beam or fly in circles. Alternatively, should the aircraft speed be greater than the time it takes the autopilot to respond to this positive signal, the aircraft is then directed back and forth across both beams in large amplitude oscillations.

This latter situation clearly illustrates that in conventional automatic instrument landing systems the pilot is required to manually control the initial aircraft approach toward the beam area of linear deviation, and only upon reaching this area may he energize the instrument landing system for automatic operation.

The present invention is thus directed toward modifying this instrument landing system to thereby enable this latter operation to be automatically performed and otherwise provide an improved automatic instrument landing system.

Referring now to Fig. 2 for a detailed consideration of one preferred embodiment of the present invention wherein the components of a conventional instrument landing system are illustrated in block form and the presently proposed additions to this combination illustrated in schematic form; a suitable antenna 19 aboard aircraft 17 receives electromagnetic energy from the radio beam or beams and feeds this energy to a localizer receiver generally designated 20. Localizer receiver 20, comprising any one of a number of receivers available to the art, detects the transmitted signal and provides a direct current output whose polarity, plus or minus, corresponds to the dominant radio beam received, and whose magnitude corresponds to the resultant intensity of this beam. This direct current signal is then reconverted into alternating current and amplified by a modulator amplifier 21; and is thereafter reconverted to direct current by a discriminator 22, to provide a high level, direct current error signal suitable for energizing a direct current responsive autopilot (not shown). Should the autopilot be of the type responsive to alternating current signals, this discriminator output may then be directed to an additional modulator, such as 23, for conversion to this desired form; and the output thereof then directed to energize the autopilot. Inasmuch as the receiver 20, modulators 21 and 23, and discriminator 22 all comprise known circuitry employed with conventional instrument landing systems, further details of their construction are believed unnecessary for a proper understanding of the present invention.

As discussed above in relation to the aircraft flight path illustrated by Fig. 1, it is essential for proper positioning of the aircraft once it reaches the area of linear deviation, that the autopilot be informed of the rate at which the intensity of the radio beam is varying to thereby overcome a radio beam position signal tending to direct the craft away from the airfield. To provide for this rate signal, a resistor capacitor differentiating circuit, of well known configuration, shown within dotted enclosure generally designated 24, is placed in series with the output circuit of discriminator 22. This rate circuit is so designed as to overcome the receiver derived position signal as the aircraft flies within the area of linear deviation thereby directing the autopilot in toward the designated airfield runway as will be more fully explained hereinafter.

Considering now the manner by which the present invention proposes to modify the above discussed conventional instrument landing system to enable automatic guidance of the aircraft to the twin radio beams from outside the area of linear deviation, and assuming the pilot has prior knowledge of the radio beam direction even though its position in space is unknown; a standard is initially adjusted by the pilot in accordance with the known radio beam direction. Thereafter the aircraft is manually guided toward the radio beams until energy from either one of the twin beams is received (i. e. positions A or B of Fig. 1). At this time the automatic instrument landing system is turned on, and the receiver sensing the radio beam thereupon energizes the autopilot to turn the aircraft toward the beam area of linear deviation as illustrated by the aircraft at positions A and B of Fig. 1. Upon the aircraft being positioned at 90° to the beam direction, the aircraft receiver signal, being of a polarity that would continue to direct the aircraft to turn away from the beam, is automatically disconnected from the autopilot and a reference guiding signal derived from the initial setting of the standard inserted therein, to thereafter automatically guide the aircraft on a stabilized 90° approach toward the beam. The aircraft is then continually directed along this 90° approach angle by the guiding signal until the radio beam area of linear deviation is reached, whereupon the guiding signal is then automatically disconnected from the autopilot, and the aircraft receiver reconnected thereto to align the craft with the beam zero dividing line 14 and direct it toward the landing strip along this line.

Referring to Fig. 2, the guiding signal generator performing this function is preferably comprised of a directional gyroscope 27, a selsyn transmitter 28, whose rotor 29 is mechanically positioned by gyro 27, and an angle resolver 30, having a stator energized by the selsyn transmitter 28 and having two rotor coils 31 and 32 wound in 90° space relationship, and manually rotatable with respect to the stator by a reference heading selector dial 33 and shaft 34. Directional gyro 27 operating in a manner well known to the art positions the rotor of selsyn 28 in accordance with the aircraft azimuth direction, and an electrical signal corresponding to this position of rotor 29 is transmitted to the stator of angle resolver 30 through the medium of the series connected selsyn stator coils. Rotor coil 31 of resolver 30 being inductively coupled with this signal then provides an output proportional to the cosine of its angle in space relative to the angle of rotor 29, and rotor coil 32 of resolver 30, wound 90° from coil 31, provides an output proportional to the sine of this angle. However, inasmuch as the rotor of resolver 30 has been initially manually positioned by the pilot in accordance with the radio beam direction, the ouput of coil 31 is proportional to the cosine of the angle between the aircraft direction and that of the radio beam, and the output of resolver coil 32 is proportional to the sine of this angle. Thus, when the aircraft is approaching the radio beam at a right angle, the angle between the gyro positioned rotor 29 and resolver rotor 31 is 90°, and the output of coil 31, generating a signal proportional to the cosine of this angle, is zero; whereas for any other aircraft approach angle toward the beam, coil 31 generates a measurable error signal.

For automatically disconnecting the radio guidance signal from the autopilot and substituting therefor this 90° approach guiding signal from rotor coil 31 at the proper time when aircraft 17 is approaching the beam at a 90° angle, a relay 35 is provided having four series of contacts 36, 37, **37*a*, and 38. Relay 35, as shown, is directly energized by the output of heading resolver coil 31, and therefore whenever the aircraft heading is other than 90° from the beam direction, a signal proportional to the cosine of the angle formed by the aircraft heading referenced to beam direction energizes relay coil 35 to open contacts 36, 37, 38, and close contacts 37*a*. In actual practice an amplifier may be provided intermediate the resolver and relay coil for enhancing this cosine signal. Similarly, when the aircraft approaches the beam at a 90° angle, relay coil 35 receiving a zero signal from coil 31 is de-energized and contacts 36, 37, and 38 are closed and contact 37*a* is open, as shown. The closing of contact 36 prevents the radio guidance signal from energizing the autopilot by shunting the output of discriminator 22 through the series circuit provided by diode 39, lead 40 and closed contacts 36. Simultaneously therewith a guiding signal from angle resolver coil 31 energizes the autopilot to continue along this 90° approach toward the beam, and this signal may be traced through lead 41, closed contact 37, and lead 42 connected to a potentiometer 43 directly across coil 31. Thus during the aircraft approach toward the beam area of linear deviation the autopilot is energized by a guiding signal which is zero, indicating a correct heading only at an approach angle of 90° and for any other heading has a value whose magnitude and polarity is proportional to any deviation from this 90° approach, thereby always correcting the aircraft approach to the desired 90° angle toward the beam. In this connection it may be particularly noted that since the 90° guiding signal is derived from the difference between the aircraft heading, provided by the directional gyro 27, and the fixed radio beam direction, determined by the manual setting of dial 33, the aircrafts approach toward the beam during this time is stabilized by the action of the directional gyro 27**.

This 90° aircraft approach path then continues as long as the aircraft remains outside the beam area of linear deviation, for outside this area the radio signal received is substantially constant, and has a magnitude and polarity (plus or minus) determined by the beam that the aircraft is approaching. However, upon the aircraft reaching the beam area of linear deviation, this radio guidance signal then commences to rapidly decrease to zero as the beam center line 14 is approached, and therefore a rate signal, generated by a differentiating circuit enclosed within a dotted line designated 24 in the output circuit of discriminator 22, is provided having a polarity opposite from that of the radio guidance signal. This signal being of opposite polarity to the radio receiver signal is therefore not shorted out through the one way diode 39, in circuit across the output of discriminator 22; but in instead directed to the autopilot through lead 44 and modulator mixer 23 whereupon it overcomes the effect of the 90° approach guiding signal over line 41 and operates to turn the aircraft in the direction of the beam toward the landing strip. To provide for a sufficiently large rate signal at this time to overcome the 90° guiding signal, closed contact 38 of relay coil 35 may be employed to change the circuit constants of rate circuit 24, as shown, or otherwise enhance its value in any suitable manner.

Upon the aircraft being aligned with the beam direction within the area of linear deviation, the angle resolver signal from coil 31, being proportional to the cosine of the angle between the new aircraft heading and beam direction, is now sufficiently large to energize relay coil 35 to open contacts 36, 37, and 38. The opening of contact 36 removes the short from across the output of discriminator 22 enabling the radio guidance signal to energize the autopilot and regain control of the aircraft. The opening of contact 38 returns the rate circuit to its normal value; the opening of contact 37 disables the cosine guiding signal from energizing the autopilot and substitutes therefor a guiding signal proportional to the sine of aircraft heading referenced to beam direction which is derived from a potentiometer 45 (across resolver coil 32) over line 46 and through newly closed contacts **37*a* to lead 41, modulator and mixer 23 and hence to the autopilot. This latter guiding signal being proportional to the sine of the angle between the aircraft heading, as determined by the directional gyro, and the beam direction, as determined by the manual setting of dial 33**, is added as a further refinement to provide a directional gyro stabilizing signal in addition to the guidance furnished by the main radio beam receiver controlled guidance.

Referring again to the sketch of Fig. 1 in order to properly correlate the above functions for one given approach path, aircraft 17 flying along path 18 outside of the beam area of linear deviation is placed under automatic instrument control at position A after the pilot has initially adjusted dial 33 to the radio beam direction. The positive radio signal received at position A automatically turns the aircraft to the right as shown by position B. Upon the aircraft reaching position B and assuming a 90° approach toward the beam, the radio signal is automatically disconnected from the autopilot and the guiding signal from the directional gyro 27 and resolver 30 substituted therefor to maintain the aircraft on a stabilized 90° approach toward the beam. After reaching the beam area of linear deviation, a large negative rate circuit signal, indicating a decreasing positive field, and therefore being of opposite polarity to the radio signal, passes through the radio signal disconnect means and overcomes the effect of the 90° guiding signal to turn the aircraft left toward the twin beam center line 14 and landing strip 11 as shown by position C. Thereafter the 90° approach guiding signal means are automatically disconnected and the radio receiver guidance again takes control to direct the aircraft on a stabilized approach path toward landing strip 11 along center line 14 as depicted by position D.

It is, of course, essential that this improved system operate properly whether the aircraft approaches the area of linear deviation from the positive beam side (beam 13) as illustrated, or from the negative beam side (beam 12); and it is also essential that the radio receiver always guide the aircraft once the area of linear deviation is reached, to the exclusion of the 90° approach signal. For enabling the proper performance of these functions, a beam selector relay is provided having a polarity responsive coil 47 and two three position contacts 48 and **48*a*. Relay coil 47, connected across the output of discriminator 22, determines which of the two radio beams is being approached by sensing the polarity of the discriminator signals, and thereafter positions contacts 48 and 48*a* in accordance with this polarity. Should the aircraft be approaching the beams from the right (beam 12), the discriminator output being negative, energizes relay coil 47 to close contacts 48 and 48*a* to the right. Similarly, should the aircraft be approaching the beams from the left (beam 13, Fig. 1) relay coil 47 closes contacts 48 and 48*a* to the left. Finally, if relay coil 47 is de-energized, indicating aircraft flight along center line 14, contacts 48 and 48*a* are positioned in the center. The closing of contact 48 to the left, places one way diode 39 in series with contact 36 to shunt the output of discriminator 22; and similarly the closing of contact 48 to the right, places one way diode 49 in series with contact 36 to shunt the output of discriminator 22. Thus, as the aircraft approaches the beam area of linear deviation from either side, beam selector relay 47 places a proper one way shorting circuit across the output of discriminator 22 to prevent energization of the autopilot by the radio signal at the time indicated by the closing of contact 48, while enabling the passage of a rate signal of opposite polarity through to the autopilot upon the aircrafts reaching the beam area of linear deviation. Upon the aircraft then passing into the beam area of linear deviation and reaching the beam zero dividing line 14, the radio signal from discriminator 22 drops to zero, relay coil 47 is de-energized, and contact 48 moving to its center position insures the passage of radio receiver signals to the autopilot for beam guidance of the aircraft. The second 3 position contact 48*a* actuated by relay 47 is provided in circuit to connect and disconnect the sine signal from the reference generator to the autopilot. As shown, both the left and right positions of this three position contact are open circuited such that when the aircraft is outside the beam area of linear deviation and on either side of the beam, the sine signal over line 46 does not energize the autopilot, whereas when the aircraft is located within the beam area, and relay 47 is de-energized, the sine signal over line 46 is connected through the center position of contact 48*a* to the autopilot for aiding in the radio beam guidance of the aircraft on a stable flight path as discussed above. Thus contact 48*a* insures that the reference generator signal proportional to the sine of the angle of aircraft heading referenced to beam direction is not introduced during the initial 90° approach path toward the beam, but only inserted after the aircraft is located within the twin beam confines adjacent zero line 14**.

Figure 3:
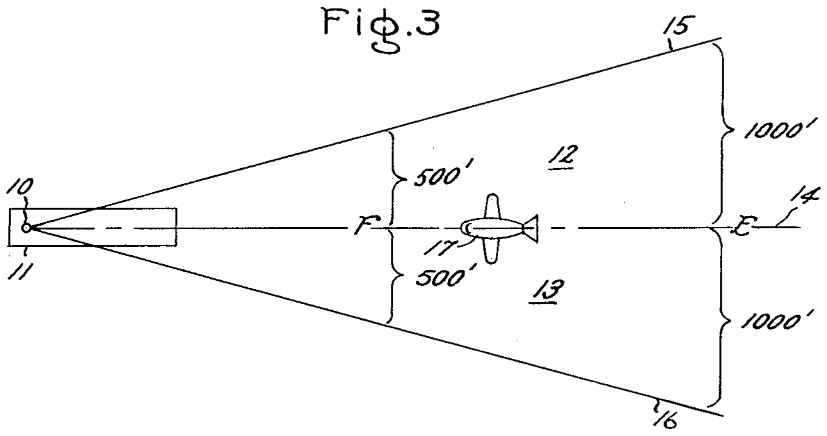
Fig. 3 is a second representative sketch of an aircraft flight path along the radio beam for illustrating an additional error arising in the automatic guidance of aircraft by instrument landing systems.

As a further refinement for enhancing the performance of this automatic instrument system in accordance with the present invention, a regulating device is proposed for automatically changing the gain of the radio guidance circuits in accordance with the aircraft distance from the airfield. Referring to Fig. 3 for enabling an understanding of the need for such regulation, it may be initially assumed that the field pattern occupied the overlapping areas of the twin radio beams 12 and 13 in space forms a cone having an apex at the airfield runway transmitter 10. The field strength as determined by an aircraft receiver detecting these radio beams indicates a zero value along the center 14 of the cone, a maximum negative value along one outer side 15 of the cone, and a maximum positive value on the other outer side 16 of the cone; and these values may be assumed to remain constant as the aircraft travels along the beams toward the airfield runway. However, considering the distances confined within the beams, it may be observed from the figure that the distance from the center line 14 to the outer sides 15 and 16 of the twin beam overlapping areas does vary in accordance with the aircraft distance from the field, for example, being 1000 feet when the aircraft is located at position E as compared to 500 feet when the aircraft is located at position F. Thus, inasmuch as the beam field strength from beam center to beam outer sides varies from zero to the same maximum value everywhere along the beam, but the distance required for this change to take place varies in accordance with aircraft location along the beam; it is readily comprehended that the error signal indicating a given aircraft deviation from center 14 varies in accordance with aircraft distance from the runway. Employing the distances cited above, this effect may be illustrated by comparing the aircraft receiver responses at portions E and F (Fig. 3), wherein an aircraft deviation of 500 feet from center 14 at position F provides a maximum receiver signal, whereas a similar aircraft deviation from center 14 at position E yields only one-half of this maximum error value. It is then obvious that compensation for this error signal variation is desirable for providing uniform autopilot response to the radio guidance control signals.

In accordance with one embodiment of the invention, this automatic gain adjustment is performed by inserting a variable attenuator intermediate the radio guidance receiver and the autopilot, and providing an actuator therefor which is responsive to the distance of the aircraft from the landing strip to automatically regulate the attenuator value in accordance with this distance; regulation of the attenuator thereby varying the gain of the radio guidance means in accordance with the aircraft distance from the landing strip to enable uniform guidance of the aircraft along the beam.

Figure 4:
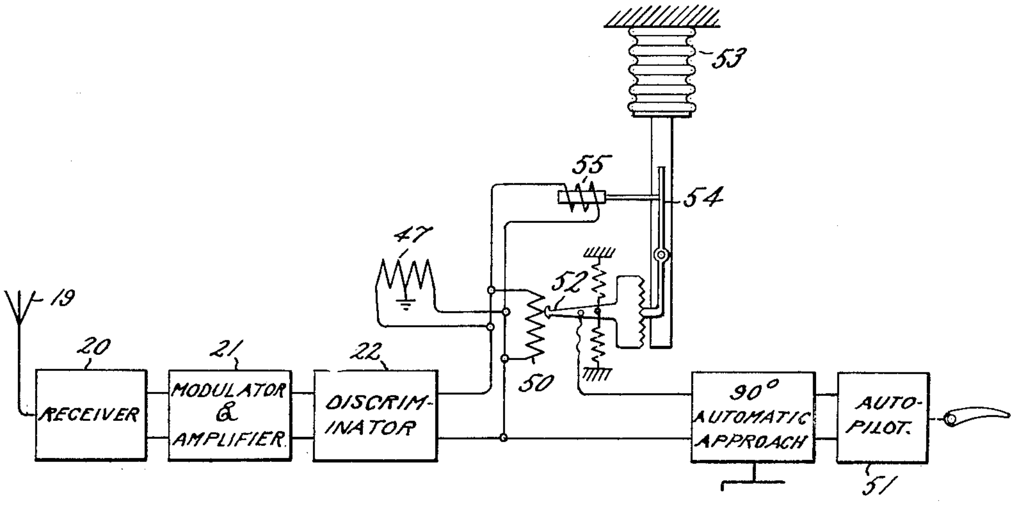
Fig. 4 is a schematic diagram partly in block form, depicting one manner of correcting for this additional error.

Referring to Fig. 4 for an illustration of one such sensitivity adjusting means for varying the radio guidance signal in accordance with the aircraft distance from the landing strip, a potentiometer 50 is placed across the output of the discriminator circuit 22 for varying the radio signal reaching the autopilot 51 in a accordance with the position of the potentiometer pick-off arm 52. This pick-off arm 52 is mechanically positioned by a bellows like actuator 53 which expands or contracts in accordance with air pressure. As the aircraft approaches the landing strip along the beam, it assumes a constant rate of descent and therefore the altitude of the aircraft along this glide path is proportional to the distance of the aircraft from the landing strip. Inasmuch as bellows 53 is responsive to air pressure and hence is responsive to aircraft altitude, a decrease in altitude, resulting in increased air pressure, causes the bellows to contract positioning the pick-off 52 of potentiometer 50 to decrease the radio guidance signal reaching the autopilot. Thus, in effect, the potentiometer is automatically adjusted to a value proportional to the aircraft distance from the landing strip, and the radio-guidance signal energizing the autopilot accordingly adjusted to enable uniform aircraft control as the aircraft approaches the landing strip. Due to the fact, however, that the pressure altitude of various airports differ, initial adjustments of the potentiometer pick-off 52 must generally be made prior to the aircrafts reaching the radio beam; and for enabling this adjustment a clutch member 54 is generally provided for normally disengaging the bellows 53 from the potentiometer pick-off arm 52. Before reaching the radio beam then, the setting of potentiometer 50 is maintained in its minimum attenuation position by appropriate means such as spring loading, as shown, and thereafter upon the aircraft reaching the radio beam emanating from the airfield, the clutch may be automatically engaged by a solenoid 55 or other suitable device actuated in accordance with the radio guidance signal to enable the automatic adjustment of the sensitivity controlling potentiometer by the bellows.

While one preferred embodiment of the invention has been depicted in accordance with the patent statutes, it is apparent that numerous variations in the above described system may be made by those skilled in the art without a substantial departure either in spirit or scope from the instant invention. Hence it is intended that all descriptive material contained in the foregoing description or illustrated by the accompanying drawing shall be interpreted as illustrative of the instant invention, and that such invention is not limited thereto.

What I claim as new and desire to secure by Letters Patent of the United States is:

1. In a radio beam controlled automatic approach and landing system for aircraft having an automatic pilot, radio guidance means for detecting the presence of said radio beam and energizing the autopilot to turn the aircraft toward the beam, reference approach means, precalibrated by the pilot, for automatically disabling said radio guidance means upon the aircraft being positioned at a predetermined approach angle toward the beam, and simultaneously therewith automatically energizing the autopilot to maintain this predetermined aircraft approach angle toward the beam, and automatic control means energized by the radio guidance means responsively to the aircraft's reaching the radio beam to energize the autopilot in opposition to said reference approach means for aligning the aircraft with the beam direction, the reference approach means being disengaged upon the aircrafts being diverted from the predetermined approach angle to thereafter enable the radio guidance means to regain control of the aircraft heading.

2. In a radio guidance system for energizing an autopilot to automatically direct an aircraft upon a preselected approach heading toward a directional path in space defined intermediate two ground propagated overlapping radio beams; and thereafter directing the craft's alignment with said path, a radio receiver means for detecting said beams and generating a signal to the autopilot for turning the aircraft toward the beams, a reference signal generator responsive to aircraft heading and being precalibrated in accordance with the radio beam direction for generating a control signal proportional to the difference between aircraft heading and radio beam direction, a control device energized by said radio receiver means and reference signal generator for disconnecting the receiver signal from the autopilot upon the aircraft being positioned toward the beam at said preselected approach heading, and simultaneously substituting therefor said reference signal for maintaining the aircraft flight direction at this preselected angle, a second control device energized by said radio receiver and responsive to the aircraft's reaching the radio beam overlapping area to energize the autopilot with a signal superseding the first control for compelling the craft's alignment with the beam direction, said first control means being de-energized upon the aircraft being diverted from said preselected approach heading to thereafter enable radio guidance within the twin beam overlapping area.

3. In a radio beam controlled automatic approach and landing system for aircraft having an autopilot, radio guidance means for detecting the presence of said radio beam and energizing the autopilot to turn the aircraft toward the beam, a directional gyro providing a signal in accordance with aircraft deviation from a preselected heading, reference approach means responsive to said directional gyro for automatically disabling said radio guidance means upon the aircraft being positioned at a predetermined approach angle toward the beam, and simultaneously energizing the autopilot to maintain this predetermined approach angle toward the beam, and automatic control means energized by the radio guidance means responsively to the aircraft's reaching the radio beam to energize the autopilot in opposition to said reference approach, means for aligning the aircraft with the beam direction, the reference approach means being disengaged upon the aircraft's being diverted from the predetermined approach angle to thereafter engage the radio guidance means to regain control of the aircraft heading.

4. In a radio beam controlled automatic approach and landing system for aircraft having an autopilot, radio guidance means for detecting the presence of said radio beam and energizing said autopilot to turn the aircraft toward the beam, a first controller energized by the radio guidance means for providing a first control signal upon detection of the radio beam, a second controller responsive to aircraft heading for generating a second control signal upon said aircraft assuming a preselected approach angle with respect to said radio beam, and generating a reference signal proportional to aircraft heading with respect to the beam, a disabling means operable when coincidentally energized by said first and second control signals for disconnecting the radio guidance means from the autopilot and substituting therefor said reference signal to maintain the aircraft heading along said preselected approach angle, and discriminating means energized by the radio guidance means responsively to the aircraft reaching the radio beam to energize the autopilot in opposition to said reference signal for compelling the aircraft's alignment with beam direction, said first and second controllers being de-energized upon the aircraft's being properly aligned within the beam to thereafter enable the radio guidance means to regain control of aircraft heading.

5. In a radio guidance system for energizing an autopilot to automatically direct an aircraft upon a preselected approach heading toward a directional path in space defined intermediate two ground propagated overlapping radio beams; and thereafter directing the craft's alignment with said path, a radio receiver means for detecting said beams and generating a signal to the autopilot discriminating therebetween to turn the aircraft toward said path from either side thereof, a first controller energized by the radio guidance means for actuating a first control means in accordance with the beam most proximate thereto, a second controller responsive to aircraft heading for generating a second control signal upon said aircraft assuming a predetermined approach angle toward said adjacent radio beam, and generating a reference signal proportional to aircraft heading referenced to said beam, a disabling means energized by said first and second controllers to be primed by actuation of said first control means and operated thereafter by receipt of said second control signal for disconnecting the receiver means from the autopilot and substituting therefor said reference signal, and discriminating means energized by the receiver means responsively to the aircraft reaching said path and entering therein to energize the autopilot in opposition to said reference signal for compelling the aircraft's alignment with beam direction, said first and second controllers being de-energized upon the aircraft's being properly aligned within said path to thereafter enable radio receiver guidance of the aircraft heading.

6. In a radio beam controlled automatic approach and landing system for an aircraft having an autopilot, means for automatically guiding the aircraft along a stabilized flight path toward said beam at a predetermined approach angle and after reaching the beam automatically align the aircraft therewith, said means including a radio guidance means for detecting the beam and energizing the autopilot to turn the aircraft toward the beam, a reference generator responsive to aircraft deviation from a reference attitude, a guiding signal generator presettable in accordance with the radio beam direction and responsive to said reference generator for providing a first signal proportional to the cosine of the angle formed by aircraft heading referenced to beam direction and a second signal proportional to the sine of said angle, a control device responsive to said first guiding signal reaching a predetermined value for disabling said radio receiver signal from energizing the autopilot and substituting said first guiding signal therefor, a means for de-energizing said control device upon the aircraft entering the radio beam to enable radio guidance of the aircraft thereafter, and additional means including a switch associated with the control means for inserting said second guiding signal to the autopilot for providing stabilization thereto upon the control means being de-energized.

7. In a radio beam controlled automatic approach system for directing an aircraft having an autopilot, toward a designated airfield, radio guidance means for detecting the presence of said radio beam and energizing the autopilot to turn the aircraft toward the beam, reference approach means, precalibrated in accordance with radio beam direction, and responsive to aircraft heading for disconnecting said radio guidance means from the autopilot upon the aircraft being positioned at a predetermined approach angle toward the beam, and simultaneously therewith energizing the autopilot to maintain this predetermined aircraft approach angle toward the beam, and control means energized by the radio guidance means responsively to the aircraft reaching the radio beam to energize the autopilot in opposition to said reference approach means for aligning the aircraft with the beam direction, the reference approach means being disengaged upon the aircraft's being diverted from the predetermined approach angle to thereafter reconnect the radio guidance means to the autopilot, and gain control means for varying the sensitivity of the radio guidance means in accordance with the aircraft distance from said airfield to thereby enable uniform guidance of the aircraft along the radio beam.

8. In a radio beam controlled automatic approach system for directing an aircraft having an autopilot toward a designated airfield, radio guidance means for detecting the presence of said radio beam and energizing the autopilot to turn the aircraft toward the beam, reference approach means, precalibrated in accordance with radio beam direction, and responsive to aircraft heading for disconnecting said radio guidance means from the autopilot upon the aircraft being positioned at a predetermined approach angle toward the beam, and simultaneously therewith energizing the autopilot to maintain this predetermined aircraft approach angle toward the beam, and control means energized by the radio guidance means responsively to the aircraft's reaching the radio beam to energize the autopilot in opposition to said reference approach means for aligning the aircraft with the beam direction, the reference approach means being disengaged upon the aircraft's being diverted from the predetermined approach angle to thereafter reconnect the radio guidance means to the autopilot, and gain control means for varying the sensitivity of the radio guidance means in accordance with the aircraft distance from said airfield to thereby enable uniform guidance of the aircraft along the radio beam, said means comprising variable attenuating means associated with said radio guidance means, and an aircraft altitude responsive device for actuating said attenuating means.

9. In an instrument landing system for automatically directing an autopilot controlled aircraft upon a preselected approach toward a directional path in space defined intermediate two ground propagated overlapping radio beams; and thereafter directing the alignment of the aircraft with said path, means for detecting said beams and generating a signal to the autopilot for turning the aircraft toward said path, precalibrated means for disabling said detecting means upon the aircraft being positioned at a predetermined approach angle toward the path, and simultaneously therewith energizing the autopilot to maintain this predetermined approach angle toward the path, and means energized by the detecting means responsively to the aircraft reaching said path to energize the autopilot in opposition to said precalibrated means for aligning the aircraft with said directional path, the precalibrated means being disengaged from enenergizing the autopilot upon the aircraft's being diverted from the predetermined approach angle to thereafter enable the detecting means to regain control of the aircraft heading.

10. In an instrument landing system for automatically directing an autopilot controlled aircraft upon a preselected approach toward a directional path in space defined intermediate two airfield propagated overlapping radio beams; and thereafter directing the alignment of the aircraft with said path, means for detecting said beams and generating a signal to the autopilot for turning the aircraft toward said path, means, for disabling said detecting means upon the aircraft being positioned at a predetermined approach angle toward the path, and simultaneously therewith energizing the autopilot to maintain this predetermined approach angle toward the path, and means energized by the detecting means responsively to the aircraft reaching said path to energize the autopilot in opposition to said predetermined approach means for aligning the aircraft with said directional space, the disabling means being disengaged from energizing the autopilot upon the aircraft being diverted from the predetermined approach angle to thereafter enable the detecting means to regain control of the aircraft heading, and gain control means for varying the sensitivity of the detecting means in accordance with the aircraft distance from said airfield to thereby enable uniform guidance of the aircraft along said directional path.

11. In an instrument landing system for automatically directing an autopilot controlled aircraft upon a preselected approach toward a directional path in space defined intermediate two airfield propagated, overlapping radio beams; and thereafter directing the alignment of the aircraft with said path, means for detecting said beams and generating a signal to the autopilot for turning the aircraft toward said path, means, precalibrated by the pilot, for disabling said detecting means upon the aircraft being positioned at a predetermined approach angle toward the path, and simultaneously therewith energizing the autopilot to maintain this predetermined approach angle toward the path, and means energized by the detecting means responsively to the aircraft reaching said path to energize the autopilot in opposition to said precalibrated means for aligning the aircraft with said directional path, the precalibrated means being disengaged from energizing the autopilot upon the aircraft being diverted from the predetermined approach angle to thereafter enable the detecting means to regain control of the aircraft heading, and gain control means for varying the sensitivity of the radio guidance means in accordance with the aircraft distance from said airfield to thereby enable uniform guidance of the aircraft along said directional path, said gain control means comprising a variable attenuating means associated with said detecting means, and an aircraft altitude responsive device for actuating said attenuating means as a function of said distance.

12. In a radio beam controlled automatic approach and landing system for an aircraft having an autopilot, means for automatically guiding the aircraft along a stabilized flight path toward a portion of said beam at a predetermined approach angle, and after reaching said beam portion automatically aligning the aircraft therewith, said means including a radio guidance means for detecting the beam and energizing the autopilot to turn the aircraft toward the beam, a reference generator responsive to aircraft deviation from a reference attitude, a guiding generator presettable in accordance with the radio beam direction and responsive to said reference generator for providing a first signal proportional to the cosine of the angle formed by aircraft heading referenced to beam direction, and a second signal proportional to the sine of said angle, a control device responsive to said first guiding signal reaching a predetermined value for disabling said radio receiver means from energizing the autopilot and substituting said first guiding signal therefor, and responsive to said first guidance signal varying from said predetermined value to enable radio guidance energization of the autopilot thereafter, and additional means including a switch associated with the control means for inserting said second guiding signal to the autopilot at the instant of reenergization by the radio guidance means, and gain control means for varying the sensitivity of the radio guidance means in accordance with the aircraft position along said radio beam to thereby enable uniform guidance of the aircraft along the radio beam, said means comprising a variable attenuating means associated with said radio guidance means, and an aircraft altitude responsive device for actuating said attenuating means as a function of said aircraft position.

13. In a radio guidance system for energizing an autopilot to automatically direct an aircraft upon a preselected approach heading toward a directional path in space defined intermediate two ground propagated overlapping radio beams; and thereafter directing the craft's alignment with said path, a radio receiver means for detecting either of said beams and generating a signal to the autopilot discriminating therebetween to turn the aircraft toward said directional path from either side thereof, precalibrated reference approach means for automatically disabling said radio guidance means upon the aircraft being positioned at a predetermined approach angle toward said directional path, and simultaneously therewith automatically energizing the autopilot to maintain this predetermined aircraft approach angle toward said directional path, and control means energized by the radio receiver means responsively to the aircraft's reaching said directional path to energize the autopilot in opposition to said reference approach means thereby aligning the aircraft with said path direction, the reference approach means being disengaged upon the aircraft being diverted from the predetermined approach angle to thereafter enable the radio receiver means to regain control of the aircraft heading, and gain control means for varying the sensitivity of the radio receiver means in accordance with the aircraft distance along said ground propagated radio beam.

References Cited in the file of this patent

UNITED STATES PATENTS

| | | |
|---|---|---|
| 2,309,314 | Harshaw | Jan. 26, 1943 |
| 2,423,336 | Mosley | July 1, 1947 |
| 2,429,595 | Abraham | Oct. 28, 1947 |
| 2,439,044 | Ferrill | Apr. 6, 1948 |
| 2,613,351 | Lang | Oct. 7, 1952 |